Patented Sept. 19, 1922.

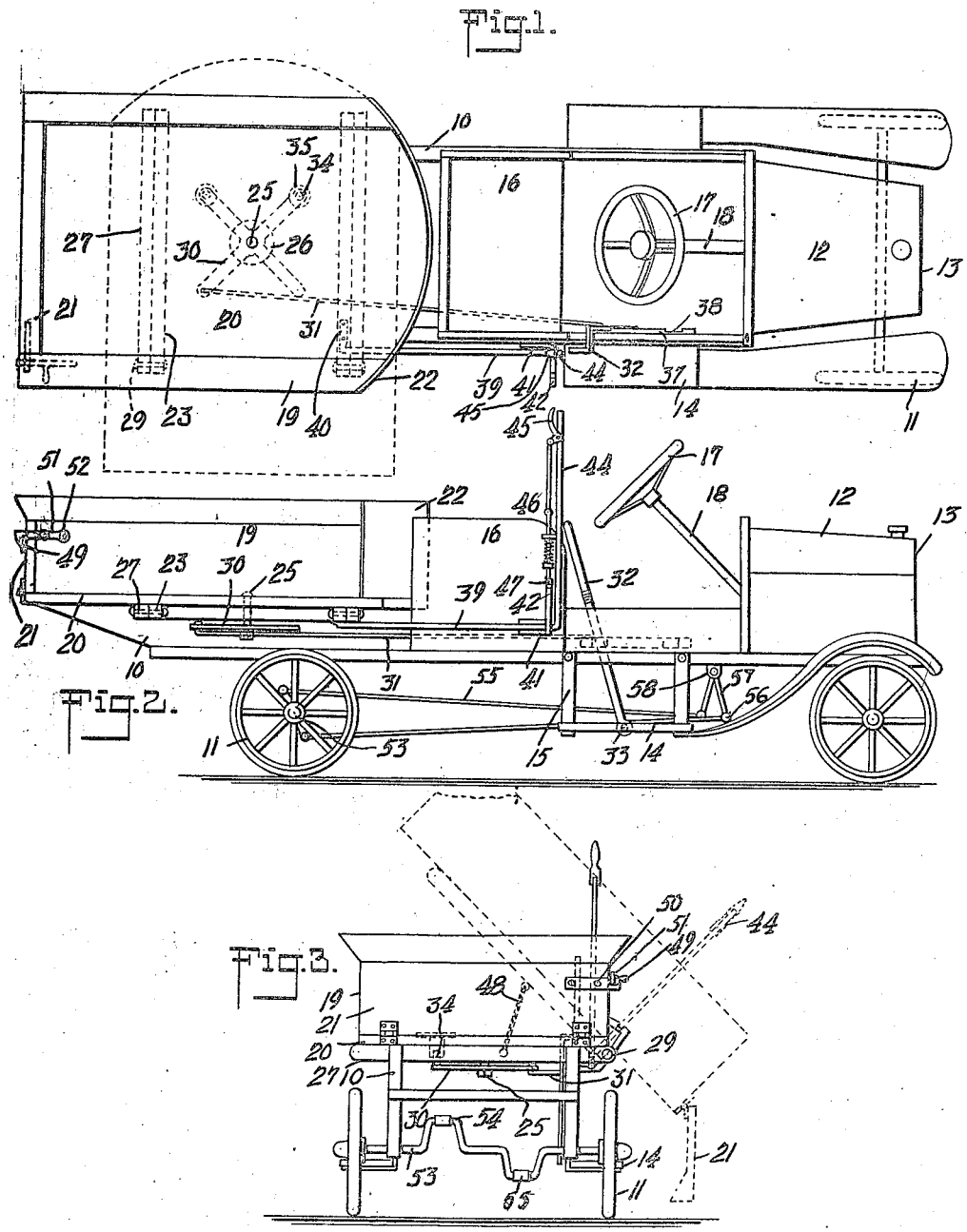

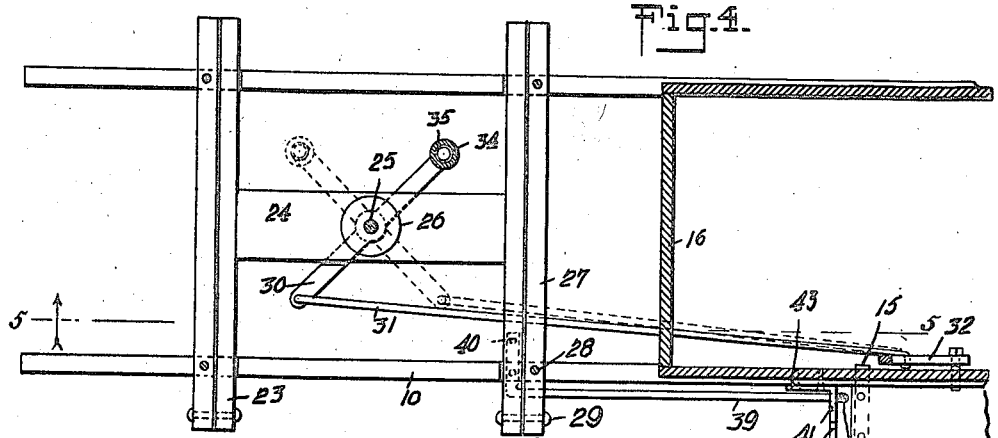
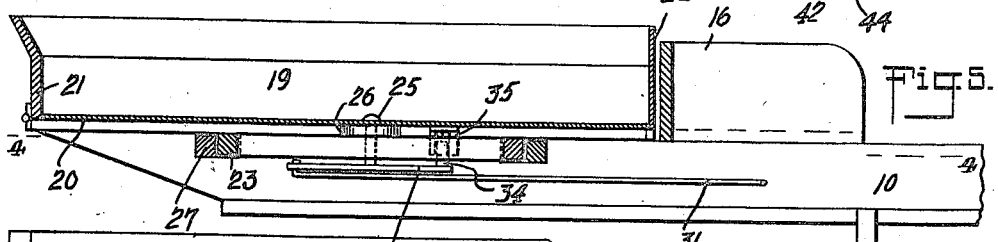
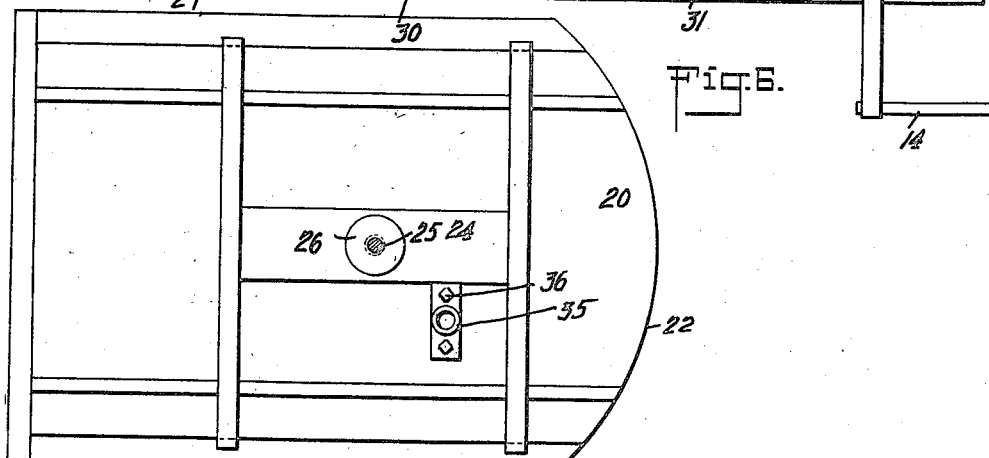
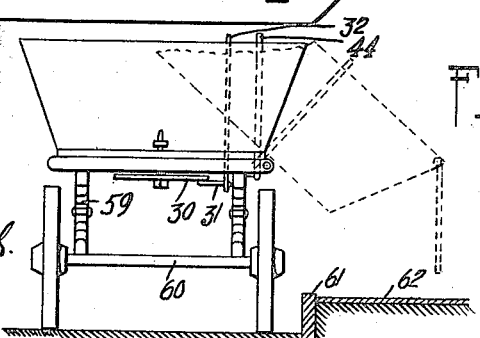

1,429,847

UNITED STATES PATENT OFFICE.

CHARLES A. DAVIDS, OF NEW YORK, N. Y.

SIDE-DUMPING VEHICLE.

Application filed August 25, 1920. Serial No. 406,000.

*To all whom it may concern:*

Be it known that I, CHARLES A. DAVIDS, a citizen of the United States, and a resident of the city of New York, Bayside, borough of Queens, in the county of Queens and State of New York, have invented a new and Improved Side-Dumping Vehicle, of which the following is a full, clear, and exact description.
This invention relates to vehicles, and has reference more particularly to a vehicle with a movable box adapted to turn laterally to the vehicle proper and then tip upwardly.
In the delivering of heavy loads such as coal, stone, or the like, considerable inconvenience is caused in crowded city streets due to the fact that the vehicles ordinarily back up to the curbing and the box tips rearwardly to deliver the load, while the length of the vehicle extends into the street thus blocking up traffic.

An object of this invention, therefore, is to provide a vehicle construction in which a movable box is operated from the driver's seat to first turn laterally to the vehicle proper and then tip upwardly so as to cause the contents thereof to slide out.

Another object of this invention is to provide a vehicle of the class indicated in which the vehicle load may be delivered at one side of the vehicle by turning the box and then tipping same without necessitating the vehicle backing up to the place on which the load is to be deposited.

A further object of this invention is to provide a toy vehicle of the construction indicated which may be propelled under foot power about the neighborhood in doing errands or for other purposes.

Reference is to be had to the accompanying drawings forming a part of this specification, in which it is understood that the drawings illustrate only one form of the invention, and in which—

Figure 1 is a plan view of my improved vehicle.

Figure 2 is a side elevation of the vehicle.

Figure 3 is a rear elevation of the vehicle.

Figure 4 is a sectional view through the vehicle being taken on the line 4—4 of Figure 5.

Figure 5 is a sectional view through the vehicle on the line 5—5 of Figure 4.

Figure 6 is a bottom view of the vehicle box.

Figure 7 is a rear elevation of the vehicle showing the method of dumping to the side.

Referring to the accompanying drawing by numerals, 10 indicates the beams forming the chassis of the vehicle, said beams being mounted on wheels 11 by any well known construction. When the vehicle is to be used as a toy for children, the vehicle may be provided with an engine hood 12 and radiator 13 to give same the appearance of an automobile, and a step 14 may be supported by brackets 15 on each side of a driver's seat 16. The front wheels may be steered by any suitable means such as a steering wheel 17 connected to the front wheels by a steering post 18.

My invention consists essentially in the construction and mode of operation of a vehicle box, said vehicle box consisting of sides 19, bottom 20, and tail gate 21. The end 22 of the vehicle box adjacent the driver's seat is arcuate in shape (Fig. 1) so as to provide clearance for turning the vehicle box to one side of the vehicle. The bottom 20 of the vehicle box is supported by a pair of parallel beams 23, said beams being connected at their center by a transverse board 24. A bolt 25 passes through the center of the board 24 and through substantially the center of the bottom 20, said bottom being spaced apart from said board by a washer 26. A pair of parallel beams 27 are secured transversely across the beams by bolts 28 so that said beams 27 are spaced apart sufficiently to include the beams 23 therebetween. One end of each beam 23 is pivoted by a pin 29 to one end of an adjacent beam 27 so that the beams 23 carrying the vehicle box may be tipped upwardly.

In order to move the vehicle box about the pin 25, I provide a lever 30 pivotally mounted between its ends to the lower end of the bolt 25. One end of the lever 30 is connected by a rod 31 to a lever 32 pivotally mounted on one of the steps 14 by a pin 33 so as to be convenient to the driver's seat. The end of the lever 30 opposite the rod 31 is provided with an upstanding lug 34 which is adapted to fit into a socket 35 secured to the box bottom 20 by bolts 36. A rack 37 having two notches 38 is secured to one of the beams 10 adjacent the lever 32 so that said lever 32 normally engages one of these notches and locks said lever in one of two positions as shown in Figure 4. In one position the tail gate 21 will be turned rearwardly of the vehicle, and in the other position said tail gate will be turned through a 90° arc to one side of the vehicle.

In order to tip the vehicle box upwardly about the pins 29, I provide a rock shaft 39, secured at one end to one of the beams 23 adjacent the pin 29 by bolts 40. One end of said shaft 39 is bent at right angles to the body portion thereof and said right-angular portion is adapted to lie under one of the members 23 in order to rock the same about its pivotal point. The opposite end of the shaft 39 opposite the beam 23 is rotatably mounted in a bearing 41 having a quadrant 42, said bearing being secured to the beam 10 by screws 43. A lever 44 is secured to the end of the shaft 39 adjacent the quadrant 42, and a hand grip 45 is pivotally mounted on the upper end of the lever 44 being connected by a rod 46 to a catch 47 engaging the quadrant 42 so that said lever may be moved outwardly from the driver's seat 16, thus tipping the beams 23 and the vehicle box upwardly about the pins 29. It is understood that the pins 29 may be so positioned that the vehicle box with its load will be about evenly balanced about said pins when the vehicle box is turned to one side, thus making it comparatively easy to tip the vehicle box and its load upwardly by use of the lever 44. With vehicles having movable boxes dumping at the rear, great difficulty is found in lifting up the front end of the box when tipping owing to the fact that the box is pivoted near its rear. In order to limit the upward movement of the vehicle box about the pins 29, I provide a chain 48 which connects one of the beams 23 to one of the beams 27, and said chain may be of any desired length to permit the upward movement of the box to a predetermined height. In order to hold the tail gate 21 in a closed position, an outstanding bar 49 is secured by screws 50 to one end of the tail gate 21 and a pivotally mounted catch 51 is secured by a bolt 52 to the box side 19, said catch 51 being provided with a notch which engages the bar 49. On toy vehicles, the catch 51 will be positioned within easy reach of the driver when the vehicle box is turned to one side.

It is understood that my improved vehicle box may be used on any type of vehicle such as a motor truck, horse driven vehicle, or toy vehicle. When used on a toy vehicle a rear axle 53 is provided with a pair of oppositely disposed offset cranks 54, each of which is connected by a rod 55 to a foot pedal 56, and the foot pedal 56 is pivotally connected to the lower end of a rod 57 pivoted at its upper end to a bracket 58 secured to the framework. Thus the child may operate the pedals 56 with its feet so as to propel the vehicle. In Figure 7 a commercial sized vehicle is shown with springs 59 supported by the rear axle 60, and in this view it is readily seen that the vehicle runs longitudinal to the curb 61 when the box dumps inwardly toward the sidewalk 62 so as to deposit coal or other materials on to the sidewalk or into a coal chute not shown.

In operation the child seated in the seat 16 propels the vehicle by operating the pedals 56 with its feet which causes the cranks 54 to rotate the wheels 11. When it is desired to dump the contents of the vehicle box, the child throws the lever 32 forwardly which causes the lever 30 to be rotated through a small arc under the action of the rod 31. The lug 34 engages the socket 35 and moves the vehicle box through a 90° arc about the pivot 25 as the bottom 20 rests on the swivel washer 26. The child loosens the catch 51 which permits the tail gate 21 to drop, and then by an outward movement of the lever 44, the beams 23 carrying the vehicle box tip upwardly about the pins 29 which cause the contents of the box to slide out to one side of the vehicle.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a dumping vehicle, in combination with the chassis thereof, a cross frame rigidly carried by the chassis, a supplemental frame pivotally mounted at one end of the cross frame, a body supported by said cross frame and supplemental frame, means for moving the body on said supplemental frame and means for tilting the supplemental frame about its pivotal point to move the body to dumping position.

2. In a device of the character described, a stationary frame, a supplemental frame pivotally mounted at one end thereof, a body carried by the supplemental frame, means for pivotally mounting said body on the supplemental frame, means for turning the body on the supplemental frame, and means for moving the supplemental frame about its pivotal point to move the body to dumping position.

3. A dumping body for vehicles comprising a stationary frame, a supplemental frame pivotally mounted at one end in the stationary frame, a body pivotally mounted on said supplemental frame, means for pivotally mounting said body on the supplemental frame, means for moving said body about its pivotal point to a position transverse of the vehicle, and means for operating the supplemental frame to rock the same about its pivotal point on the stationary frame and move the body to dumping position transverse of the vehicle frame.

4. In combination with a vehicle, a stationary supporting member, a swinging supporting member pivotally mounted thereon, a body revolvably mounted on said swinging supporting member, and means for revolving the body about its pivotal point to a position at right angles to the longitudinal axis of the vehicle to facilitate dumping of the body.

CHARLES A. DAVIDS.